(12) United States Patent
Lee et al.

(10) Patent No.: US 10,678,739 B1
(45) Date of Patent: Jun. 9, 2020

(54) ELECTRONIC SYSTEM, HOST DEVICE AND CONTROL METHOD

(71) Applicant: Wistron Corporation, New Taipei (TW)

(72) Inventors: Syu-Siang Lee, New Taipei (TW); Yin-Hsin Chang, New Taipei (TW); Wen-Bin Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/538,808

(22) Filed: Aug. 12, 2019

(30) Foreign Application Priority Data

May 2, 2019 (TW) .............................. 108115248 A

(51) Int. Cl.
*G06F 13/40* (2006.01)
*G06F 1/24* (2006.01)
*G06F 1/26* (2006.01)

(52) U.S. Cl.
CPC ............ *G06F 13/4081* (2013.01); *G06F 1/24* (2013.01); *G06F 1/266* (2013.01)

(58) Field of Classification Search
CPC ......... G06F 13/4081; G06F 1/266; G06F 1/24
See application file for complete search history.

(56) References Cited

U.S. PATENT DOCUMENTS

| | | | |
|---|---|---|---|
| 6,182,173 B1 * | 1/2001 | Grosser | G06F 13/4081 361/58 |
| 9,569,241 B2 * | 2/2017 | Tsirkin | G06F 9/45558 |
| 9,858,230 B2 * | 1/2018 | Cai | G06F 13/4081 |
| 9,940,291 B2 * | 4/2018 | Bacha | G06F 13/4221 |
| 2004/0177202 A1 * | 9/2004 | Won | G06F 13/4081 710/302 |
| 2010/0035461 A1 * | 2/2010 | Berke | H01R 13/641 439/489 |
| 2016/0182217 A1 * | 6/2016 | Hashizume | H04L 7/0041 375/354 |

* cited by examiner

*Primary Examiner* — Henry Tsai
*Assistant Examiner* — Christopher Daley
(74) *Attorney, Agent, or Firm* — Winston Hsu

(57) ABSTRACT

An electronic system, a host device and a control method are provided. The electronic system includes a host device, a cable and a slave device. The slave device receives supply power for operation. The cable is coupled between the host device and the slave device. The host device includes a data transmission interface circuit, a management circuit and a central processing unit. The data transmission interface circuit includes a reset circuit. The reset circuit is utilized for detecting whether the slave device has powered on and accordingly generating a simulated hot plug signal. The management circuit is utilized for determining a hot plug state between the host device and the slave device according to the simulated hot plug signal and accordingly generating a control signal. The central processing unit is utilized for establishing a link between the host device and the slave device according to the control signal.

18 Claims, 7 Drawing Sheets

ELECTRONIC SYSTEM, HOST DEVICE AND CONTROL METHOD

BACKGROUND OF THE INVENTION

1. Field of the Invention

The present invention relates to an electronic system, a host and a control method, and more particularly, to an electronic system, a host and a control method for peripheral component interconnect express (PCIe) bus interface.

2. Description of the Prior Art

With development of computer and peripheral interface technology, a peripheral component interconnect express (PCI-E or PCIe) interface has become one of the most important transmission interfaces for communication and data transmission between a computer and a peripheral. Since the PCIe bus interface provides high speed data transmission and also supports hot plug function, the PCIe bus interface is now widely used in various external devices for data transmissions and connections, such as a desktop computer, a server computer, a notebook, an embedded system product, a storage system and a flash drive.

In the conventional PCIe transmission system, a user needs to simultaneously boot up a host device and a slave device in order to meet the requirements defined in a card electromechanical (CEM) specification, such that the host device can recognize the slave device. The conventional hot plug removal detection method determines whether the slave device has been removed from the host device by detecting a hot plug presence detect pin. When the slave device is removed from the host device, a signal on the hot plug presence detect pin changes from a low voltage level to a high voltage level, thereby determining that the current PCIe interface card (slave device) has been removed. When the slave device is inserted into the host device, the signal on the hot plug presence detect pin changes from the high voltage level to the low voltage level, thereby determining that the current PCIe interface card (slave device) has been inserted into a card slot (host device).

However, in the current electronic device, a device manufacturer may insert a PCIe interface card into a PCIe slot, so that the PCIe interface card and the PCIe slot have been kept in the hot insertion state before selling the electronic device. Under such a situation, only when the host device and the slave device are booted simultaneously, a PCIe bus interface initialization can be performed and a link between the host device and the slave device can be established. Moreover, the host device may be connected to an external device through the PCIe interface card. Since the power management systems of the host device and the external device are completely independent of each other, the host device and the external device may be booted at different time. Thus, the host device will fail to recognize the slave devices and the host device and the slave device are not recognized by each other (i.e. do not meet the operating sequence defined in the PCIe specification). In addition, in practical applications, it is difficult to simultaneously boot up the host device and the slave device while the user manually operates the start switches to respectively boot the host device and the slave device. Thus, the prior art has to be improved.

SUMMARY OF THE INVENTION

Therefore, the present invention primarily provides an electronic system, a host and a control method for PCIe bus interface to solve the above mentioned problems.

The present invention discloses an electronic system, comprising: a slave device, for receiving supply power for operation; a cable coupled to the slave device; and a host device coupled to the cable, comprising: a data transmission interface circuit, comprising: a reset circuit coupled to the cable for detecting whether the slave device has powered on and accordingly generating a simulated hot plug signal; a management circuit coupled to the reset circuit for determining a hot plug state between the host device and the slave device according to the simulated hot plug signal and accordingly generating a control signal; and a central processing unit coupled to the management circuit for establishing a link between the host device and the slave device according to the control signal.

The present further invention discloses a host device, the host device being coupled to a slave device through a cable, comprising: a data transmission interface circuit, comprising: a reset circuit coupled to the cable for detecting whether the slave device has powered on and accordingly generating a simulated hot plug signal; a management circuit coupled to the data transmission interface circuit for determining a hot plug state between the host device and the slave device according to the simulated hot plug signal and accordingly generating a control signal; and a central processing unit for establishing a link between the host device and the slave device according to the control signal.

The present further invention discloses a control method, for an electronic system, the electronic system comprising a host device, a cable and a slave device, the host device comprising a data transmission interface circuit, a management circuit and a central processing unit, the data transmission interface circuit comprising a reset circuit, the cable coupled between the host device and slave device, the control method comprising: utilizing the reset circuit to detect whether the slave device has powered on through the cable and accordingly generate a simulated hot plug signal; utilizing the management circuit to determine a hot plug state between the host device and the slave device according to the simulated hot plug signal and accordingly generate a control signal; and utilizing the central processing unit to establish a link between the host device and the slave device according to the control signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
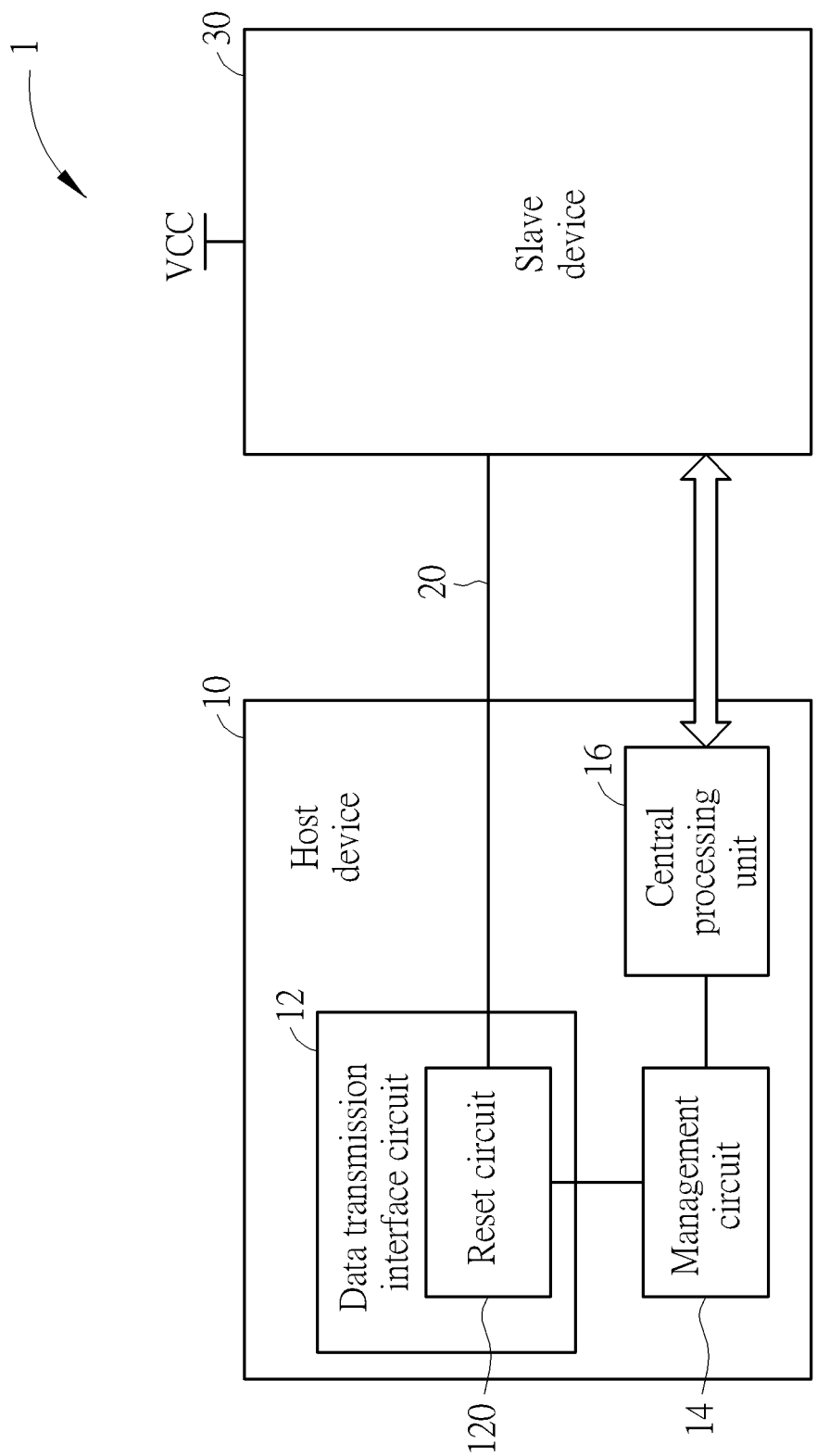
FIG. 1 is a schematic diagram illustrating an electronic system according to an embodiment of the present invention.

Please refer to FIG. 1, which is a schematic diagram illustrating an electronic system 1 according to an embodiment of the present invention. For example, the electronic system 1 can be applied to signal transmissions of a peripheral component interconnect express (PCIe or PCI-E) interface. The electronic system 1 includes a host device 10, a cable 20 and a slave device 30. The host device 10 and the slave device 30 are PCIe data transmission devices. The host device 10 and the slave device 30 respectively include a PCIe bus interface (not shown in figures), and the host device 10 can communicate with the slave device 30 through the PCIe bus interface. Each of the host device 10 and the slave device 30 can be a desktop computer, a server computer, a notebook, a storage system, a flash drive, a mobile communication device or an embedded system product, but not limited thereto. The cable 20 is coupled to the host device 10 and the slave device 30. The host device 10 can be connected to the slave device 30 through the cable 20. The cable 20 can be a connection component of a PCIe bus interface.

The host device 10 includes a data transmission interface circuit 12, a management circuit 14 and a central processing unit 16. The data transmission interface circuit 12 is coupled to the cable 20 and the management circuit 14. The data transmission interface circuit 12 includes, but is not limited to, a PCIe bus interface (not shown in figures). The data transmission interface circuit 12 further includes a reset circuit 120. The reset circuit 120 is coupled to the cable 20. The reset circuit 120 can detect whether the slave device 30 has powered on and accordingly generate a simulated hot plug signal to the management circuit 14. The management circuit 14 is coupled to the data transmission interface circuit 12 for determining a hot plug state between the host device 10 and the slave device 30 according to the simulated hot plug signal generated by the reset circuit 120 and accordingly generating a control signal. For example, the management circuit 14 can be a baseboard management controller (BMC), but is not limited thereto. The central processing unit 16 is utilized for establishing a link between the host device 10 and the slave device 30 according to the control signal generated by the management circuit 14. In addition, the data transmission interface circuit 12, the reset circuit 120 and the management circuit 14 can be integrated circuit devices.

The slave device 30 can receive supply power Vcc provided by a power supply (not shown in figures) for operation. The supply power Vcc can be a power source P3V3, a power source P12V or a standby power source P3V3_STBY of the slave device 30, or any other system power source of the slave device 30. Since the cable 20 is coupled between the reset circuit 120 and the slave device 30, the reset circuit 120 can receive a power detection signal associated with the supply power Vcc from the slave device 30 through the cable 20. For example, the power detection signal can be a power good signal associated with the supply power Vcc. The power good signal indicates whether the supply power Vcc is in the normal range. The power detection signal can be a weak current power signal associated with the supply power Vcc. The weak current power signal associated with the supply power Vcc can reflect the magnitude and phase of the supply power Vcc. For example, the weak current power signal is proportional to the supply power Vcc. In addition, the weak current power signal can be the supply power Vcc or any electrical signal related to the supply power Vcc.

Moreover, after receiving the power detection signal associated with the supply power Vcc, the reset circuit 120 detects whether the slave device 30 has powered on according to the received power detection signal. When determining that the slave device 30 has powered on, the reset circuit 120 generates a simulated hot plug signal and the simulated hot plug signal indicates that a hot removal event and a hot insertion event have occurred. The hot removal event occurs prior to the hot insertion event. For example, the simulated hot plug signal can be a pulse signal. In other words, when determining that the slave device 30 has powered on, the reset circuit 120 emulates and generates a simulated hot plug signal. After that, the management circuit 14 determines that the hot removal event and the hot insertion event are sequentially implemented according to the simulated hot plug signal. As a result, the host device 10 and the slave device 30 may really be in the hot insertion state without actually performing the removal action and insertion action in order. The simulated hot plug signal is emulated and generated based on determining that the slave device 30 has powered on. The simulated hot plug signal is emulated and generated without based on the physical insertion action that the slave device 30 is physically inserted into the host device 10 or the physical removal action that the slave device 30 is physically removed from the host device 10. In addition, when determining that the slave device 30 does not power on, the reset circuit 120 generates a simulated hot plug signal and the simulated hot plug signal indicates that no removal event or hot insertion event has occurred.

The management circuit 14 is utilized for determining the hot plug state between the host device 10 and the slave device 30 according to the simulated hot plug signal generated by the reset circuit 120. For example, the management circuit 14 determines the hot plug state is that a removal event and a hot insertion event have occurred sequentially according to the simulated hot plug signal generated by the reset circuit 120, and accordingly, the management circuit 14 generates a corresponding control signal to inform the central processing unit 16 of establishing a link between the host device 10 and the slave device 30. In more detail, based on determining that the removal event and the hot insertion event have occurred sequentially, the management circuit 14 determines that the host device 10 needs to re-establish a link of the PCIe bus interface with the slave device 30, such that the management circuit 14 generates a corresponding control signal to inform the central processing unit 16 about establishing a link between the host device 10 and the slave device 30. The central processing unit 16 establishes a link between the host device 10 and the slave device 30 according to the control signal generated by the management circuit 14.

In other words, the host device 10 generates the control signal to control the central processing unit 16 based on detecting whether the slave device has powered on. Therefore, the central processing unit 16 is controlled to establish a link between the host device 10 and the slave device 30 according to the control signal. As such, the data transmission links can be properly established without actually performing removal and insertion action for the host device 10, the slave device 30 and the cable 20. During the normal operation, when the slave device 30 in a powered state (e.g., under normal operation mode S0) is connected to the host device 10 through the cable 20, the overall operations of the electronic system. 1 will meet the requirements defined in the PCIe specification.

Figure 2:
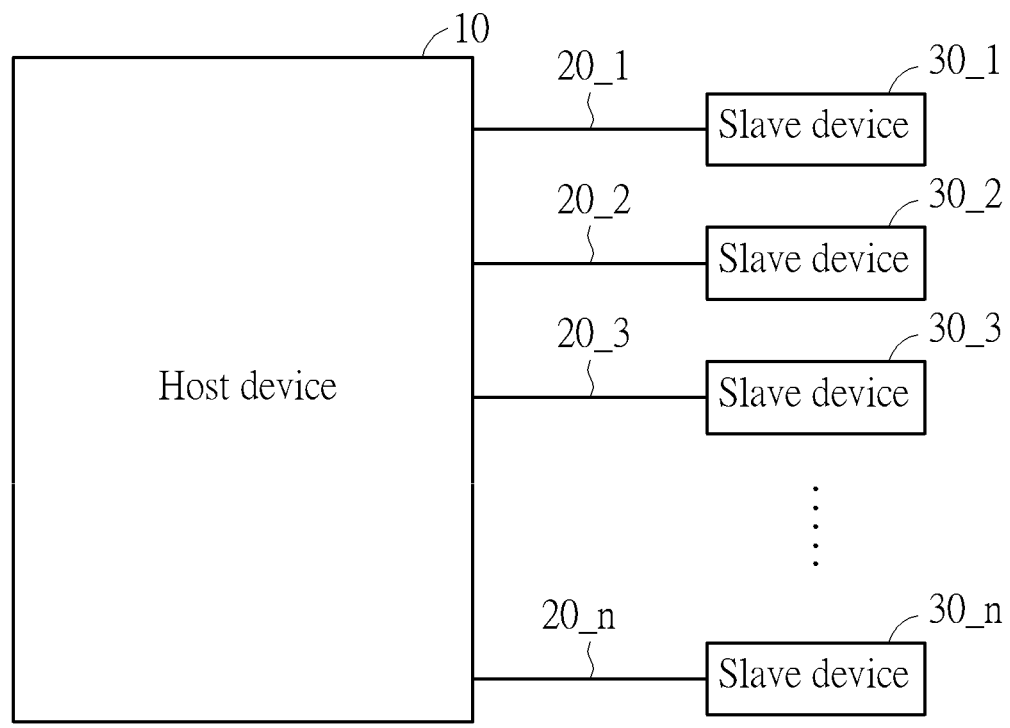
FIG. 2 is a schematic diagram illustrating an application type of the electronic system shown in FIG. 1 according to an embodiment of the present invention.
Figure 3:
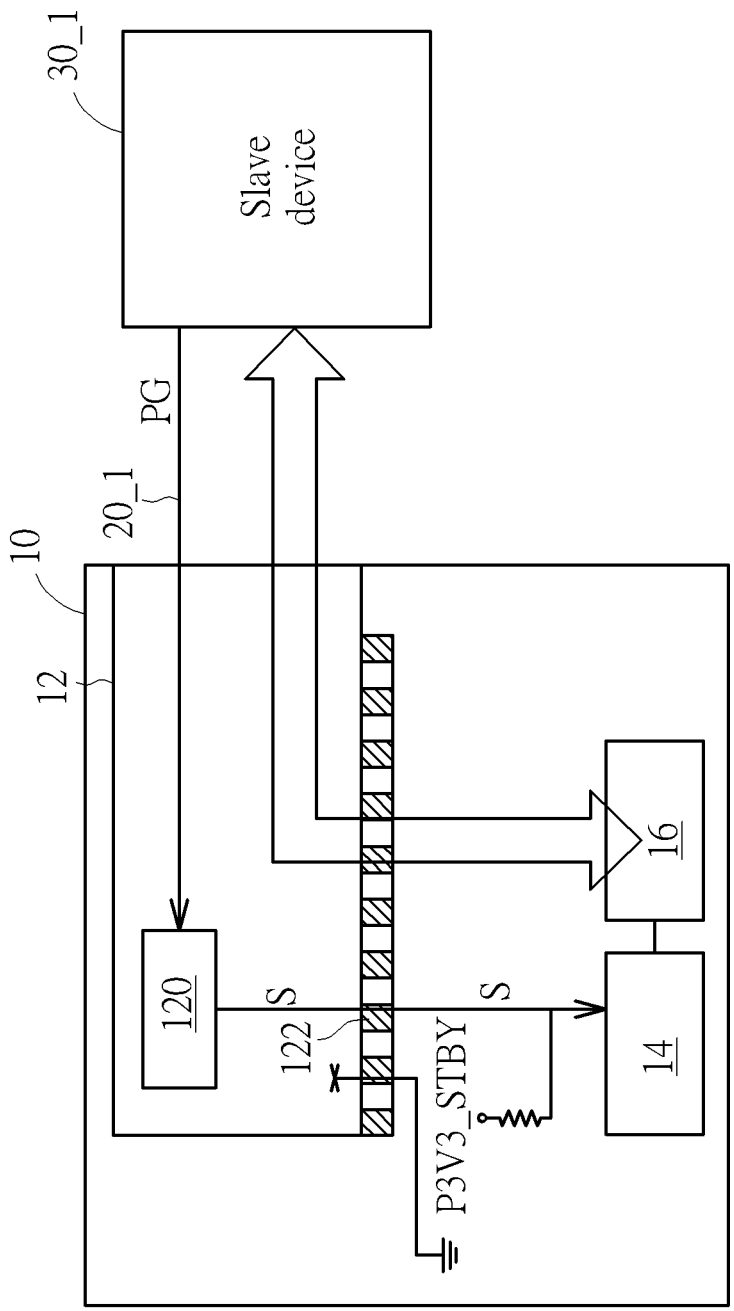
FIG. 3 is a schematic diagram illustrating the host device and the slave device shown in FIG. 2 according to an embodiment of the present invention.
Figure 4:
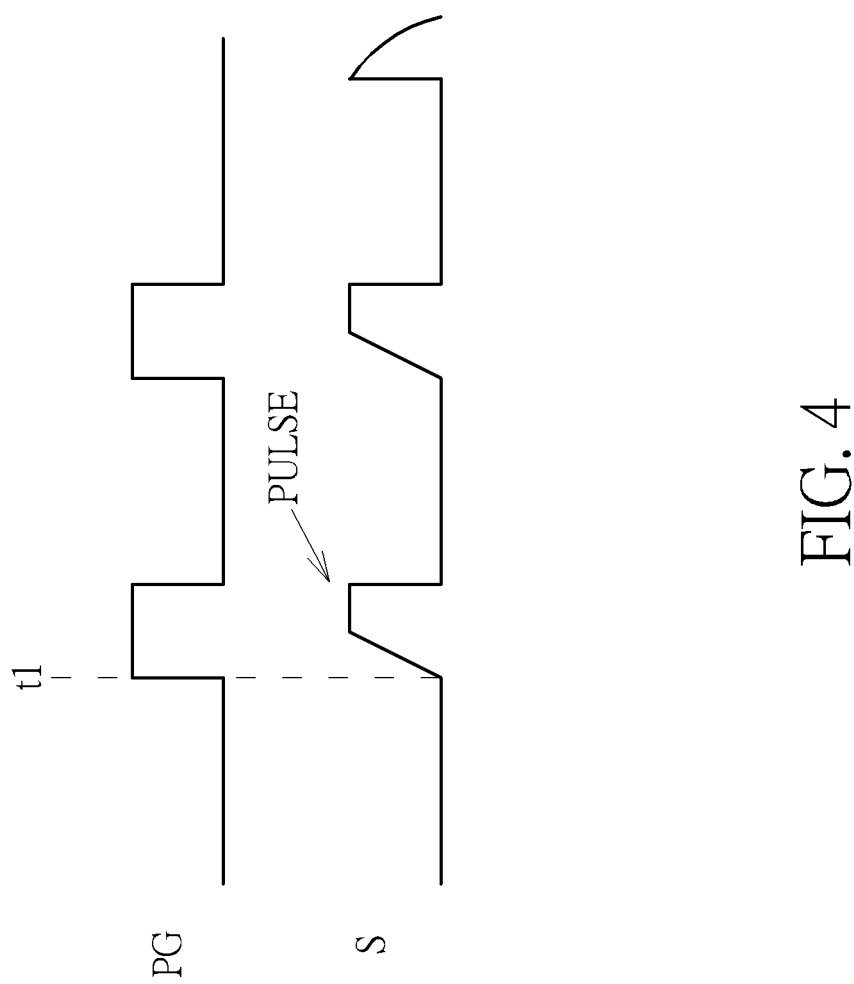
FIG. 4 is a waveform diagram illustrating the host device and the slave device shown in FIG. 2 according to an embodiment of the present invention.

Please refer to FIG. 2, which is a schematic diagram illustrating a first application type of the electronic system 1 shown in FIG. 1 according to an embodiment of the present invention. As shown in FIG. 2, slave devices 30_1 to 30_n are connected to the host device 10 through cables 20_1 to 20_n. For example, the host device 10 can be a storage system and the slave devices 30_1 to 30_n can be a just a bunch of flash (JBOF) system. The host device 10 can detect whether each slave device has powered on and accordingly establish a link with the each slave device. For example, please refer to FIG. 3 and FIG. 4. FIG. 3 is a schematic diagram illustrating the host device 10 and the slave device 30_1 shown in FIG. 2 according to an embodiment of the present invention. FIG. 4 is a waveform diagram illustrating the host device 10 and the slave device 30_1 shown in FIG. 2 according to an embodiment of the present invention. Through the cable 20_1, the reset circuit 120 of the host device 10 can receive a power good signal PG associated with the supply power applied to the slave device 30_1 from the slave device 30_1. The power good signal PG can be generated by the power supply of the slave device 30_1 or the slave device 30_1 itself. The reset circuit 120 can determine whether the slave device 30_1 has powered on according to the received power good signal PG. As shown in FIG. 4, at time t1, the power good signal PG changes from a low level to a high level, this means that the supply power applied to the slave device 30_1 is already stable and within the normal range. Therefore, the reset circuit 120 determines that the slave device 30_1 has already powered on according to the power good signal PG. In addition, the reset circuit 120 can also determines whether the slave device 30_1 has powered on according to a weak current power signal associated with the supply power of the slave device 30_1 or any other electrical signal associated with the supply power of the slave device 30_1.

When determining that the slave device 30_1 has powered on, the reset circuit 120 generates a simulated hot plug signal S having a pulse signal PULSE to the management circuit 14. The rising edge of the pulse signal PULSE indicates occurrence of a hot removal event. The falling edge of the pulse signal PULSE indicates occurrence of a hot insertion event. The pulse width of the pulse signal PULSE may be between 100 ms and 250 ms, but not limited thereto. As shown in FIG. 3, the data transmission interface circuit 12 includes a pin 122. The reset circuit 120 and the management circuit 14 are coupled to the pin 122. The reset circuit 120 transmits the pulse signal PULSE of the simulated hot plug signal S to the management circuit 14 through the pin 122. The pin 122 can be a hot plug presence detection pin. For example, the pin 122 can be a PCIe PRSNT2# pin. For example, if the host device 10 is a PCIe x1 device, the pin 122 can be, but not limited to, the pin B17. If the host device 10 is a PCIe x4 device, the pin 122 can be, but not limited to, the pin B31. If the host device 10 is a PCIe x8 device, the pin 122 can be, but not limited to, the pin B48. If the host device 10 is a PCIe x16 device, the pin 122 can be, but not limited to, the pin B81.

When receiving the simulated hot plug signal S, the management circuit 14 determines a hot plug state between the host device 10 and the slave device 30_1 according to the pulse signal PULSE of the simulated hot plug signal. According to the PCIe specification, when the voltage level of the hot plug presence detection pin is at the high voltage level, this means that the slave device has not been inserted into the slot of the host device. When the voltage level of the hot plug presence detection pin is at the low voltage level, this means that the slave device has been inserted into the slot of the host device. Therefore, when receiving the pulse signal PULSE of the simulated hot plug signal via the pin 122 and detecting the rising edge of the pulse signal PULSE, the management circuit 14 determines that the hot plug state changes from an insertion state to a removal state (which means a hot removal event occurred) based on detecting the rising edge of the pulse signal PULSE. When detecting the falling edge of the pulse signal PULSE, the management circuit 14 determines that the hot plug state changes from the removal state to the insertion state (which means a hot insertion event occurred) based on detecting the fall edge of the pulse signal PULSE. That is, the management circuit 14 determines that the hot removal event and the hot insertion event have occurred sequentially according to the pulse signal PULSE. Accordingly, the management circuit 14 generating a corresponding control signal to inform the central processing unit 16 about establishing a link between the host device 10 and the slave device 30_1. The central processing unit 16 performs a link initialization process by using in-band mechanism and establishes a link between the host device 10 and the slave device 30_1 according to the control signal generated by the management circuit 14.

Figure 5:
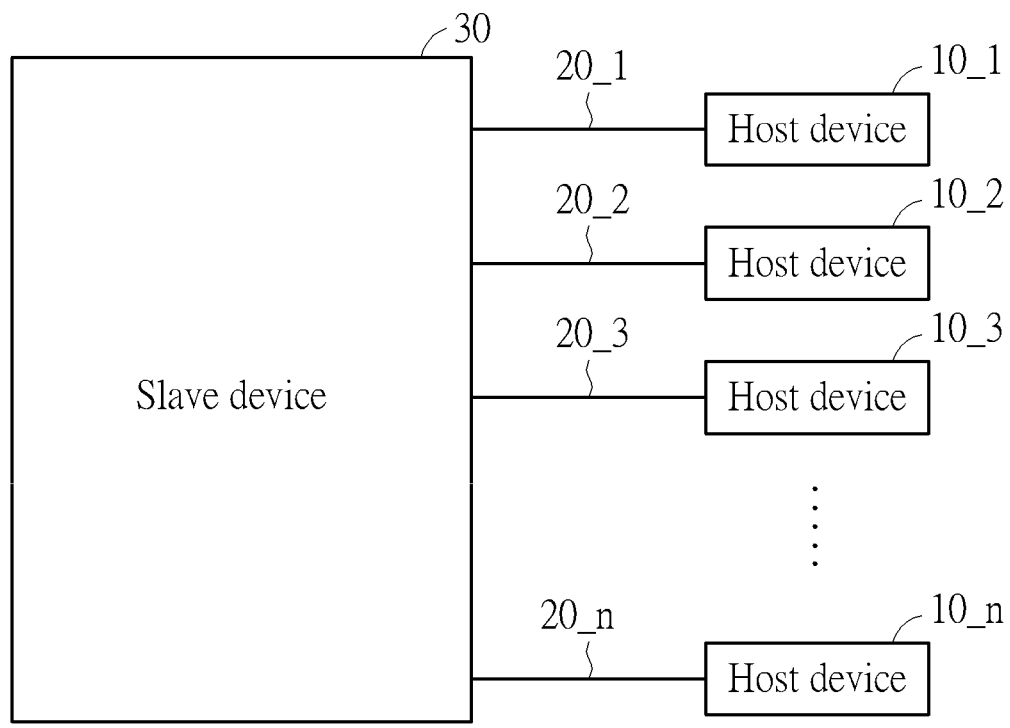
FIG. 5 is a schematic diagram illustrating an application type of the electronic system shown in FIG. 1 according to an alternative embodiment of the present invention.
Figure 6:
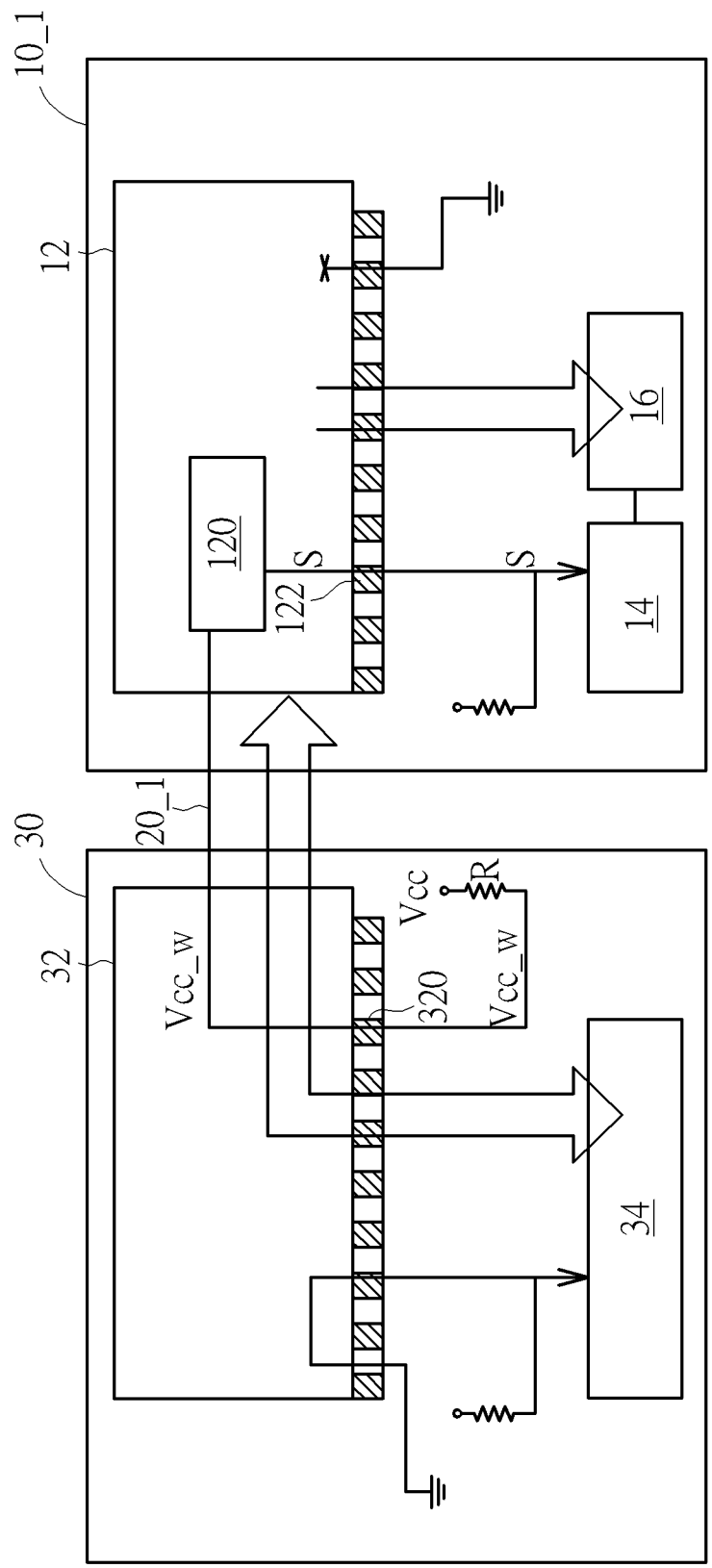
FIG. 6 is a schematic diagram illustrating the host device and the slave device shown in FIG. 5 according to an embodiment of the present invention.
Figure 7:
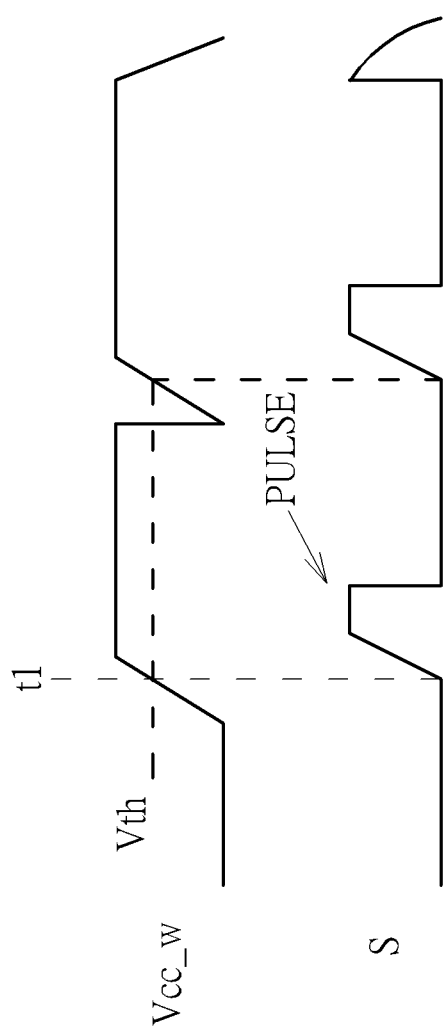
FIG. 7 is a waveform diagram illustrating the host device and the slave device shown in FIG. 5 according to an embodiment of the present invention.

Please refer to FIG. 5, which is a schematic diagram illustrating a second application type of the electronic system 1 shown in FIG. 1 according to an embodiment of the present invention. As shown in FIG. 5, host devices 10_1 to 10_n are connected to the slave device 30 through cables 20_1 to 20_n. For example, the host devices 10_1 to 10_n can be storage systems and the slave devices 30 can be a JBOF. For each host device, the each host device can detect whether the slave device 30 has powered on and accordingly establish a link with the slave device 30. For example, please refer to FIG. 6 and FIG. 7. FIG. 6 is a schematic diagram illustrating the host device 10_1 and the slave device 30 shown in FIG. 5 according to an embodiment of the present invention. FIG. 7 is a waveform diagram illustrating the host device 10_1 and the slave device 30 shown in FIG. 5 according to an embodiment of the present invention. As shown in FIG. 6, the slave device 30 includes a data transmission interface circuit 32 and a switch 34. The data transmission interface circuit 32 includes a pin 320. A first terminal of the cable 20_1 is coupled to a reset circuit 120 of the host device 10_1. A second terminal of the cable 20_1 is coupled to the pin 320. The supply power Vcc of the slave device 30 is converted to a weak current power signal Vcc w through a resistor R1. The weak current power signal Vcc w is transmitted to the reset circuit 120 of the host device 10_1 through the pin 320 and the cable 20_1.

After receiving the weak current power signal Vcc w, the reset circuit 120 can determine whether the slave device 30 has powered on according to the received weak current power signal Vcc w. As shown in FIG. 7, the weak current power signal Vcc w is greater than a threshold value Vth, this means that supply power Vcc of the slave device 30 is already stable and within the normal range. As such, the reset circuit 120 determines that the slave device 30 has already powered on according to the weak current power signal Vcc w. In addition, the reset circuit 120 can also determines whether the slave device 30 has powered on according to a power good signal associated with the supply power of the slave device 30 or any other electrical signal associated with the supply power of the slave device 30. When determining that the slave device 30 has powered on, the reset circuit 120 generates a simulated hot plug signal S having a pulse signal PULSE to the management circuit 14. The rising edge of the pulse signal PULSE indicates occurrence of a hot removal event. The falling edge of the pulse signal PULSE indicates occurrence of a hot insertion event. As shown in FIG. 6, the data transmission interface circuit 12 includes a pin 122. The reset circuit 120 and the management circuit 14 are coupled to the pin 122. The pin 122 can be a hot plug presence detection pin. The reset circuit 120 transmits the pulse signal PULSE of the simulated hot plug signal S to the management circuit 14 through the pin 122.

When receiving the pulse signal PULSE of the simulated hot plug signal via the pin 122 and detecting the rising edge of the pulse signal PULSE, the management circuit 14 determines that the hot plug state changes from an insertion state to a removal state (which means a hot removal event occurred) based on detecting the rising edge of the pulse signal PULSE. When detecting the falling edge of the pulse signal PULSE, the management circuit 14 determines that the hot plug state changes from the removal state to the insertion state (which means a hot insertion event occurred) based on detecting the fall edge of the pulse signal PULSE. That is, the management circuit 14 determines that the hot removal event and the hot insertion event have occurred sequentially according to the pulse signal PULSE. Accordingly, the management circuit 14 generating a corresponding control signal to inform the central processing unit 16 about establishing a link between the host device 10_1 and the slave device 30. The central processing unit 16 performs a link initialization process by using in-band mechanism and establishes a link between the host device 10_1 and the slave device 30 according to the control signal generated by the management circuit 14. In other words, when multiple host devices share the same slave device, each host device can respectively establish a link between the each host device and the slave device according the above-mentioned method so as to directly access resources in the slave device. Moreover, the user also does not need to perform any conventional button pressing operation on the slave device.

To sum up, in the embodiments of the invention, the host device can detect whether the slave device has powered on and according generate the control signal to control to establish a link between the host device and the slave device. As a result, the embodiments of the invention can enable and establish the data transmission link between the host device and the slave device without controlling the power on sequence, and also without actually performing the removal action and the insertion action to the real hardware (e.g., host device, slave and cable), thus improving the system reliability, stability and scalability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system, comprising:
   a slave device, for receiving supply power for operation;
   a cable coupled to the slave device; and
   a host device coupled to the cable, comprising:
      a data transmission interface circuit, comprising:
         a reset circuit coupled to the cable for detecting whether the slave device has powered on and accordingly generating a simulated hot plug signal;
         a management circuit coupled to the reset circuit for determining a hot plug state between the host device and the slave device according to the simulated hot plug signal and accordingly generating a control signal; and
      a central processing unit coupled to the management circuit for establishing a link between the host device and the slave device according to the control signal.

2. The electronic system of claim 1, wherein the reset circuit detects a power detection signal associated with the supply power, determines whether the slave device has powered on according to the power detection signal associated with the supply power and accordingly generates the simulated hot plug signal.

3. The electronic system of claim 1, wherein when detecting that the slave device has powered on, the reset circuit generates the simulated hot plug signal, the simulated hot plug signal indicates that a hot removal event and a hot insertion event have occurred, wherein the hot removal event occurs prior to the hot insertion event.

4. The electronic system of claim 3, wherein the simulated hot plug signal is a pulse signal.

5. The electronic system of claim 1, wherein the data transmission interface circuit further comprises a pin, the reset circuit and the management circuit are coupled to the pin, and the reset circuit transmits the simulated hot plug signal to the management circuit through the pin.

6. The electronic system of claim 5, wherein the pin is a hot plug presence detection pin.

7. A host device, the host device being coupled to a slave device through a cable, comprising:
   a data transmission interface circuit, comprising:
      a reset circuit coupled to the cable for detecting whether the slave device has powered on and accordingly generating a simulated hot plug signal;
      a management circuit coupled to the data transmission interface circuit for determining a hot plug state between the host device and the slave device according to the simulated hot plug signal and accordingly generating a control signal; and
   a central processing unit for establishing a link between the host device and the slave device according to the control signal.

8. The host device of claim 7 wherein the reset circuit detects a power detection signal associated with supply power of the slave device, determines whether the slave device has powered on according to the power detection signal associated with the supply power of the slave device and accordingly generates the simulated hot plug signal.

9. The host device of claim 7, wherein when detecting that the slave device has powered on, the reset circuit generates the simulated hot plug signal, the simulated hot plug signal indicates that a hot removal event and a hot insertion event have occurred, wherein the hot removal event occurs prior to the hot insertion event.

10. The host device of claim 9, wherein the simulated hot plug signal is a pulse signal.

11. The host device of claim 7, wherein the data transmission interface circuit further comprises a pin, the reset circuit and the management circuit are coupled to the pin, and the reset circuit transmits the simulated hot plug signal to the management circuit through the pin.

12. The host device of claim 11, wherein the pin is a hot plug presence detection pin.

13. A control method, for an electronic system, the electronic system comprising a host device, a cable and a slave device, the host device comprising a data transmission interface circuit, a management circuit and a central processing unit, the data transmission interface circuit comprising a reset circuit, the cable being coupled between the host device and slave device, the control method comprising:
  utilizing the reset circuit to detect whether the slave device has powered on through the cable and accordingly generate a simulated hot plug signal;
  utilizing the management circuit to determine a hot plug state between the host device and the slave device according to the simulated hot plug signal and accordingly generate a control signal; and
  utilizing the central processing unit to establish a link between the host device and the slave device according to the control signal.

14. The control method of claim 13, wherein the reset circuit detects a power detection signal associated with the supply power of the slave device, determines whether the slave device has powered on according to the power detection signal associated with the supply power of the slave device and accordingly generates the simulated hot plug signal.

15. The control method of claim 13, wherein when detecting that the slave device has powered on, the reset circuit generates the simulated hot plug signal, the simulated hot plug signal indicates that a hot removal event and a hot insertion event have occurred, wherein the hot removal event occurs prior to the hot insertion event.

16. The control method of claim 15, wherein the simulated hot plug signal is a pulse signal.

17. The control method of claim 13, wherein the data transmission interface circuit further comprises a pin, the reset circuit and the management circuit are coupled to the pin, and the reset circuit transmits the simulated hot plug signal to the management circuit through the pin.

18. The control method of claim 17, wherein the pin is a hot plug presence detection pin.

* * * * *